United States Patent [19]

Madion

[11] Patent Number: 4,705,495
[45] Date of Patent: Nov. 10, 1987

[54] EMERGENCY V-BELT

[76] Inventor: Herbert E. Madion, 41329 GlocaMora St., Mt. Clemens, Mich. 48045

[21] Appl. No.: 850,722

[22] Filed: Apr. 11, 1986

Related U.S. Application Data

[63] Continuation of Ser. No. 653,306, Sep. 20, 1984, abandoned.

[51] Int. Cl.[4] .................................................. F16G 7/06
[52] U.S. Cl. ................................... 474/255; 24/31 C; 156/304.5; 474/265
[58] Field of Search ....................... 474/253, 254, 255; 24/31 C, 31 L, 38, 443, 31 B, 31 F, 442; 156/304.3, 304.5; D2/244, 633, 635

[56] References Cited

U.S. PATENT DOCUMENTS

| | | | |
|---|---|---|---|
| 738,150 | 9/1903 | Beland | 24/31 L |
| 1,300,345 | 4/1919 | Case | 24/31 L |
| 1,303,027 | 5/1919 | Carr | 24/38 |
| 2,461,201 | 2/1949 | Ellis | 24/31 L |
| 2,799,177 | 7/1957 | Henson | 474/255 |
| 2,930,478 | 3/1960 | Ruffino | 24/38 |
| 3,464,094 | 9/1969 | Mates | 24/443 |
| 3,744,095 | 7/1973 | Tomlinson | 24/38 |
| 3,748,699 | 7/1973 | Cunningham | 24/31 L |
| 3,777,586 | 12/1973 | Stirton | 24/31 R |
| 4,254,666 | 3/1981 | Seredick | 474/253 |
| 4,437,849 | 3/1984 | Berg | 474/256 |
| 4,445,877 | 5/1984 | Love et al. | 474/255 |

FOREIGN PATENT DOCUMENTS 2419951 11/1975 Fed. Rep. of Germany ...... 474/255

OTHER PUBLICATIONS

IBM Technical Disclosure Bulletin, vol. 26, No. 2, R. B. Shuman, Jul., 1983.

Primary Examiner—John Petrakes
Assistant Examiner—Katherine Matecki
Attorney, Agent, or Firm—Gifford, Groh, VanOphem, Sheridan, Sprinkle and Dolgorukov

[57] ABSTRACT

A V-belt for emergency use has projecting abutments on opposite ends of a length of belt material. The abutments can be brought into intermeshed relationship and the two ends of the belt secured together by fastening means.

1 Claim, 5 Drawing Figures

U.S. Patent
Nov. 10, 1987
4,705,495
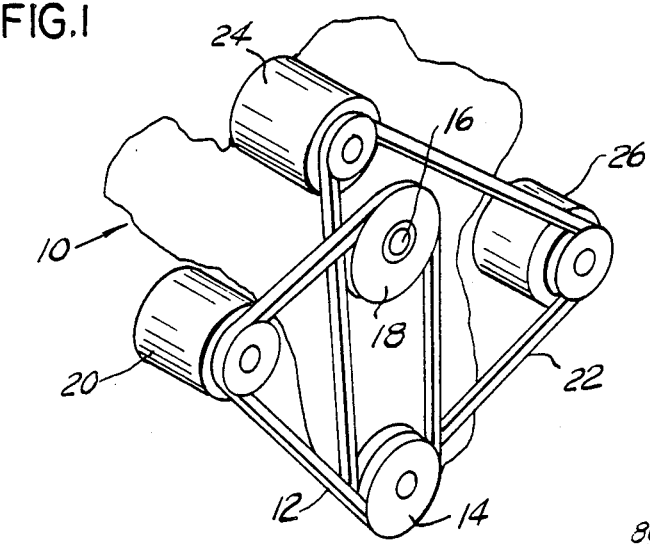
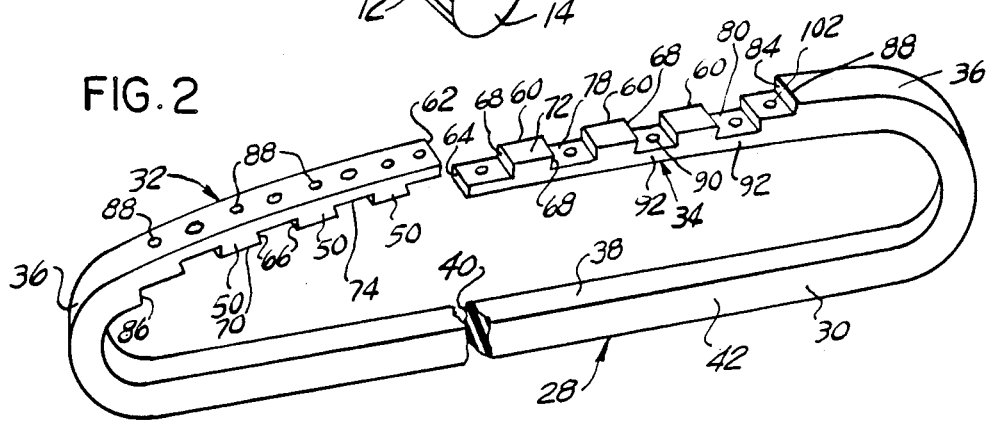

EMERGENCY V-BELT

This is a continuation of application Ser. No. 653,306 filed Sept. 20, 1984, now abandoned.

This invention pertains to V-belts for pulleys such as those employed in motor vehicles. More particularly the invention pertains to belts for use when emergency repairs are necessary.

BACKGROUND OF THE INVENTION

V-belts for motor vehicles are well known and usually replacements for failed belts are available at motor vehicle fuel-service stations, garages, etc. However, like other usually reliable elements of a motor vehicle failure can occur without warning and at inconvenient times and places. Service facilities may be closed or a long distance away. Even when near a service station or other source the latter may be just out of the belt size needed. Without a proper belt to reestablish reliable motive power the vehicle is useless unless an emergency repair can be made. The frequency of such occurrences has led to many attempts to provide satisfactory emergency repair means. These usually embody concepts such as using free-ended, unconnected, belt material and fastening means or other interlocking means which will make it possible to connect the free ends to form belts of a range of sizes (lengths) from a single strip of belt material. Many forms of fastening means for joining the belt ends have been devised, including interlocking teeth, special attachments and pins and rivets. Many such attempts to meet the need for a satisfactory emergency belt are disclosed by the prior art. For example, U. S. Pat. No. 3,744,095, granted July 10, 1973, discloses the use of internesting tongue and groove-like projections at the two ends of the belt strip and pins inserted transversely through the internesting members.

U.S. Pat. No. 3,748,699 granted July 31, 1973, on the other hand, discloses the use of interengaging transversely extending slots in the belt ends and a tongue member having projecting "blades" which are received in the transversely extending slots, thus connecting the two slotted ends.

U.S. Pat. No. 4,254,666 discloses the use of a uniquely formed belt having interfitting ends, one of which can be directed through a channel in the other end and upwardly from the channel outwardly through one of a series of openings in the channel. The mating sections of the belt ends are tapered and provided with teeth such that the ends interlock with each other as one end is pulled into the outwardly through one of the openings.

U.S. Pat. No. 4,437,849 granted Mar. 20, 1984 discloses the use of another specially formed molded belt, and a separate bar-like ratchet member receivable in a grooved channel at one end of the belt and also receivable within a likely grooved channel at the other end of the belt. The grooved channel extends from one end of the belt to the other end. The belt ends are drawn together by advancing the separate ratchet member into one or both of the belt ends.

U.S. Pat. No. 4,445,877 granted May 1, 1984 teaches the use of a special fixture, termed a receiver, which is attached to a first end of an open belt by riveting and crimping. The receiver has a channel through which the second end of the open belt, the other end, is extended. A pivotally mounted belt gripping knife-like blade is mounted in the fixture such that the blade can be swung into and out of a position transverse of the channel. In use the second end of the belt is extended through the channel and grasped to tighten the belt, thereafer upon a slight relaxation of the force on the belt the knife-like blade impinges upon the second belt end, thus locking the second belt end within the receiver.

The above patents illustrate rather complex specially designed elements and/or attachments that have been devised for "emergency" belts and/or to provide a variable length belt for general use as a substitution for the ordinary closed loop V-belts. According to the prior art neither cost nor complexity seem to be of consequence in their design. Possible problems resulting from projections extending from a belt or from discontinuity in a belt cross-section also seem to have been ignored.

SUMMARY OF THE INVENTION

A principal objective of the instant invention is to provide an emergency adjustable V-belt of a relatively simple design as contrasted with previously known belts, and one which does not involve projecting ridges, or have vastly differing cross-sections along the belt length.

According to another object of the invention there is provided an emergency V-belt which can be made of the same structure as an ordinary continuous V-belt and which in service functions with substantially the same amount of stress, the same balance, and the same load carrying ability as an ordinary continuous V-belt. Discontinuities, high stress points, projections and other factors which give unequal pulley contact or load of distribution are avoided according to the invention.

Yet an additional object of the invention is to provide an emergency belt which can be easily installed by a motorist of only average mechanical ability.

According to the invention, an ordinary V-belt structure is modified to provide separate ends having complementary structures of simple form which can be readily interlocked and securely held in load bearing contact. Substantial mating abutting members are provided which extend transversely of the axis of the belt for a substantial distance. Simple tooth-like projections of limited height and/or of short length are avoided. In addition secure fastening means are employed, according to the invention, which do not interfere with normal belt action.

A belt embodying the principles of the instant invention functions in a manner substantially the same as an ordinary replacement belt, and undue loads are not placed on pulleys, drive units or the belts themselves because of peculiarities of the belt cross-section or because of projecting elements.

BRIEF DESCRIPTION OF THE DRAWINGS

FIG. 1 is a fragmentary perspective view illustrating a typical arrangement of V-belts on a motor vehicle engine;

FIG. 2 is a perspective view of an emergency belt constructed according to the invention;

FIG. 3 is a fragmentary side elevation showing the two ends of the belt of FIG. 2 assembled;

FIG. 4 is a section taken along line 4—4 of FIG. 3, enlarged for clarity, and showing also a portion of a pulley; and FIG. 5 is a view similar to FIG. 4, but showing a modification thereof.

DETAILED DESCRIPTION OF THE PREFERRED EMBODIMENT

Referring now to FIG. 1 which schematically illustrates a typical belt arrangement for a motor vehicle engine 10 having a V-belt 12 which is driven by a pulley 14 mounted on an end of the engine crankshaft, and which drives in turn the water pump shaft 16 connected to a pulley 18 and an alternator 20. A fan, not shown, is usually also mounted on the waterpump shaft 16, and as known in the art the alternator 20 is mounted on a pivoting bracket in a manner such that it can be swung inwardly to make it easier to replace the belt 12 and outwardly to apply tension or to adjust tension. A second belt 22 drives an air conditional compressor 24 and an adjustably mounted power steering pump 26.

Many other drive arrangements employ belts. Some of these, including some in motor vehicles and motor boats, have drive arrangements such that with the right size replacement belt available it is possible to field fit a replacement belt where there has been a failure. In many cases, however, it is difficult to install even the proper replacement belt without special tools and considerable time to remove obstructions and reinstall them. Without the proper size of belt even an easy installation is impossible.

According to the present invention there is provided an emergency replacement belt which can be used in place of a range of belt sizes and which in addition can be inserted in difficult places without special tools, with little know-how and without spending substantial amounts of time. The belt nonetheless can be tensioned and carries loads for a reasonable length of time.

As shown at FIGS. 2, 3 and 4, a belt 28 according to the invention comprises an elongated belt member 30 having a first end portion 32 and a second end portion 34.

The belt member 30 has an outer surface 36 and an inner surface 38 parallel to the outer surface 36 and joined by tapered side walls 40 and 42 to the outer surface 36. The central longitudinal plane of the belt is indicated by numeral 44, FIG. 3, and the outer and inner surfaces 36 and 38 are substantially equally spaced from this central plane 44. The first end portion 32 of the belt member 30 is provided with a series of cog-like abutments 50 projecting inwardly with respect to the outer surface 36. These abutments 50 are equally spaced along the belt first end portion 32. The second end portion 34 of the belt member 30 has a complementary series of cog-like abutments 60 projecting outwardly with respect to the inner surface 38. The abutments 60 are equally spaced along the second belt end portion 34.

The abutments 50 and 60 extend in serial order from the respective outermost ends 62 and 64 of the first end portion 32 and the second end portion 34, respectively. The abutments 50 and the abutments 60 are identical in dimension and form. Each abutment 50, as shown in FIGS. 2 and 3, comprises a pair of substantially planar abutting faces 66 extending normal to the central plane 44 of the belt member 30 and transversely of the outer and the inner surfaces 36 and 38 of the belt member 30. The abutments 60 have, similarly, a pair of substantially parallel planar abutting faces 68 also extending normal to the central plane 44 and transversely of the outer and the inner surfaces 36 and 38 of the belt member 30. The planar abutting faces 66 of each abutment 50 are joined by a surface or land 70, and the planar abutting faces 68 of each abutment 60 are joined by a surface or land 72, each land 70 or 72 extending parallel to the central plane 44 and transversely across the belt member 30 from one tapered sidewall 40 to the other tapered sidewall 42. A recess 74 is thus formed between consecutive cog-like abutments 50 having a bottom surface 76 and a recess 78 is formed between consecutive cog-like abutments 60, having a bottom surface 80, the recess bottom surfaces 76 and 80 extending parallel to the central plane 44 completely across the belt member 30 from the sidewall 40 to the sidewall 42. The length of the lands 70 is equal to the length of the recess bottom surfaces 76 and the length of the lands 72 is equal to the length of the recess bottom surface 80. Accordingly the cog-like abutments 50 and 60 of the belt end portions 32 and 34 intermesh when brought together as illustrated in FIG. 3, the end 62 of the belt end portion 32 being engaged with a ledge 84 extending from the outer surface 36 of the belt member 30 towards the central plane 44 of the belt member 30 where the belt end portion 34 is provided with the cog-like abutment 60 and the end 64 of the belt end portion 34 abutting against a similar ledge 86 relative to the belt end portion 32.

The two belt end portions 32 and 34 are attached together by appropriate elongated fasteners passed through appropriate aligned bores extending from the outer surface 36 of the belt member 30 to the inner surface 38. For example, a bore, such as bore 88, FIGS. 2 and 4, is disposed centrally through each of the cog-like abutments 50 in the belt end portion 32 which is aligned with a corresponding bore 90 formed in each bridging portions, designated by numeral 92, between consecutive cog-like abutments 60 in the belt end portion 34. In the structure of FIGS. 3-4, the elongate fasteners are in the form of machine screws 106 passed through the aligned bores 88 and 90 and threaded at their end into, preferably, locking nuts 114. Locking nuts 114 are well known in the art and employ resilient inserts that press into the threads of the screws 106, thus resiliently and frictionally locking the screws 106 to the nuts 114. The nuts 114 are preferably embedded in the belt end portion 34 at the bridge portions 92 so as to be flush with the inner surface 38 of the belt member 30. The length of the machine screws 106 is not too critical as their end may project slightly into the pulley groove 116, FIG. 4, without danger of interfering with belt performance.

FIG. 5 illustrates a second form of elongated fasteners consisting of push pins 118 and push-on lock nuts 120, both of which are known in the fastening art, for fastening the belt ends together. The push-nuts 120 are preferably embedded in the belting as in the form shown in FIG. 5.

Although three full cog-like abutments 50 have been illustrated formed at the belt end portion 32 cooperating with an equal number of cog-like abutments 60 formed at the second end portion 34 of the belt member 30, it will be appreciated that the number of cog-like abutments 50 and 60, and corresponding recesses 74 and 78 may be any desired number, and may even extend over the majority of the length of the belt member 30. The belt member 30 may be adjusted to any appropriate length, within range, and the thickness of the belt 28 where the two end portions 32 and 34 are joined, is substantially the same as the thickness of the belt member 30.

The length of the belt member 30 being carried for emergency use can be selected for a particular vehicle to be long enough to replace the longest belt on the vehicle, yet within limits, it is possible to also use the same belt member 30 to replace shorter belts on the vehicle. This can be done by shortening the belt member 30 by cutting off substantially off length sections at its ends, as long as enough cog-like abutments 50 and 60, two or three, for example, are left to insure appropriate attachment of the belt end portions 32 and 34. On the other hand separate emergency belts of proper pre-cut lengths for the several belts on a particular vehicle can be carried for emergency use where difficulty in replacement alone makes it extremely difficult for the average person to make repairs with a closed loop conventional V-belt, and dictates the use of a belt that can be inserted behind components and snaked over pulleys.

With a belt member according to the instant invention it is only necessary to snake the belt member over the pulleys, place the cog-like abutments in internesting contact, and apply the fastening means, to provide an emergency repair. The emergency belt can then be tensioned in the normal manner, if necessary. With the form of the invention illustrated at FIG. 4 an ordinary screwdriver can be used to secure the two belt end portions 32 and 34 to each other. In the form shown at FIG. 5 the pins 118 can be pushed into the sockets or pushnuts 120 manually and/or tapped into place with a hammer or other blunt instrument. With both forms adhesive can also be applied first and the abutments and fastening means thereafter connected to provide an even more secure engagement.

The resulting belt is of the same size and shape as the belt it replaces. Unusual gaps in the belt, and/or projections, as well as arrangements that produce uneven loads throughout the belt are avoided. The belt functions as a straight line load transmitter fully the equivalent of a conventional closed loop belt in its operation.

Having thus described the present invention by way of an example of structure thereof, modifications whereof will be apparent to those skilled in the art, what is claimed as new is as follows:

I claim:
1. A drive belt of the V-belt type comprising an elongated flexible belt member having a first end and a second end, said first end and said second end being adapted to be brought into facing and overlapping relationship with each other and to be attached to each other to form a continuous closed loop belt, wherein said belt member has an upper surface and a lower surface extending parallel to each other over a substantial length of said belt member, said upper surface being of greater width than said lower surface, said belt member having a longitudinally extending central plane situated substantially at mid-distance between said upper surface and said lower surface, said first end of said belt member comprising a first group of substantially identical cog-like abutments projecting downwardly with respect to said upper surface of said belt member, said cog-like abutments of said first group being equally spaced along and extending transversely across said belt member adjacent said first end, said second end of said belt member comprising a second group of substantially identical cog-like abutments projecting upwardly with respect to said lower surface of said belt member, said cog-like abutments of said second group being equally spaced along and extending transversely across said belt member, each of said cog-like abutments extending substantially the same distance beyond said central plane and comprising a pair of planar end faces each extending normal to said central plane and being joined by a planar surface, wherein consecutive cog-like abutments at said first end and at said second end of said belt member have planar surfaces of equal length and are separated by a distance substantially equal to the planar surface length of each of said cog-like abutments, whereby said first end and said second end of said belt member can be brought into facing and overlapping relationship with each of said cog-like abutments at said first end of said belt member engaged between consecutive cog-like abutments at said second end of said belt member with said planar faces and said planar surfaces in force transmitting and flatly abutting relationship, and further comprising means for fastening said first end and said second end of said belt member together for maintaining said cog-like abutments in inter-engaged relationship, said fastening means comprising at least one fastener extending through one cog-like abutment of either said first or second group and through the space between two cog-like abutments on the other of said first or second group.

* * * * *